United States Patent
Frischmuth et al.

(10) Patent No.: US 10,488,729 B2
(45) Date of Patent: Nov. 26, 2019

(54) PLANAR LIGHT MODULATION APPARATUS HAVING SWITCHABLE MULTISTABLE TRANSMITTANCES AND/OR MULTISTABLE SCATTERING PROPERTIES WITH REGARD TO VISIBLE LIGHT

(71) Applicant: CONTINENTAL AUTOMOTIVE GMBH, Hannover (DE)

(72) Inventors: Tobias Frischmuth, Vienna (AT); Rene Hinterberger, Vienna (AT); Peter Gubesch, Vienna (AT); Johannes Greil, Vienna (AT)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/101,701

(22) Filed: Aug. 13, 2018

(65) Prior Publication Data
US 2019/0049758 A1    Feb. 14, 2019

(30) Foreign Application Priority Data
Aug. 11, 2017   (DE) .......................... 10 2017 214 093

(51) Int. Cl.
| | | |
|---|---|---|
| G02F 1/133 | (2006.01) |
| G02F 1/139 | (2006.01) |
| G02F 1/01 | (2006.01) |
| G02F 1/13 | (2006.01) |
| G02F 1/1334 | (2006.01) |

(Continued)

(52) U.S. Cl.
CPC ............ *G02F 1/139* (2013.01); *G02F 1/0147* (2013.01); *G02F 1/132* (2013.01); *G02F 1/1334* (2013.01); *G02F 1/167* (2013.01); *G02F 1/172* (2013.01)

(58) Field of Classification Search
CPC ........ G02F 1/13; G02F 1/133; G02F 1/13306; G02F 1/1313; G02F 1/1333; G02F 1/133362; G02F 1/1334; G02F 1/167; G02F 1/0147; G02F 1/172; G02F 1/132;
(Continued)

(56) References Cited

U.S. PATENT DOCUMENTS

| | | |
|---|---|---|
| 3,773,684 A | 11/1973 | Marks |
| 4,196,974 A | 4/1980 | Hareng et al. |
| 5,409,734 A * | 4/1995 | Lee .................. B32B 17/10036 252/583 |

* cited by examiner

*Primary Examiner* — Thoi V Duong
(74) *Attorney, Agent, or Firm* — Laurence A. Greenberg; Werner H. Stemer; Ralph E. Locher

(57) ABSTRACT

A planar light modulation apparatus includes first and second planar, transparent substrates, each with a transparent, electrically conductive coating. The coatings are connectable to an electrical voltage source. A light modulation element in the space between the coatings includes a first dielectric material with a predefinable concentration of particles dispersed therein. While the particles are randomly arranged in the first dielectric material they render the light modulation element substantially nontransmissive for light impinging thereon or cause the light modulation element to appear opaque. Up to about 25° C. or higher and at atmospheric pressure, the first dielectric material is solid or has a viscosity that does not allow the particles to change their alignment based on Brownian motion. The material can be heated with a heating device to lower the viscosity and to allow the particles to alter their alignment in the first dielectric material on the basis of Brownian motion.

20 Claims, 4 Drawing Sheets

(51) Int. Cl.
*G02F 1/167* (2019.01)
*G02F 1/17* (2019.01)

(58) Field of Classification Search
CPC .................. G02F 1/139; G02F 1/1391; G02F 2001/1678; G02F 2001/139; G02F 2001/13775
See application file for complete search history.

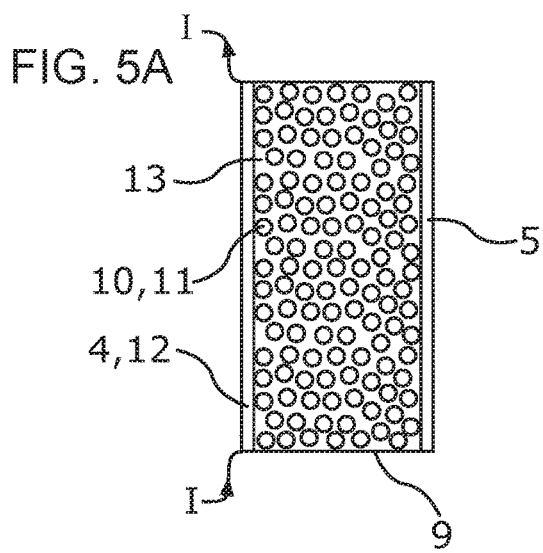
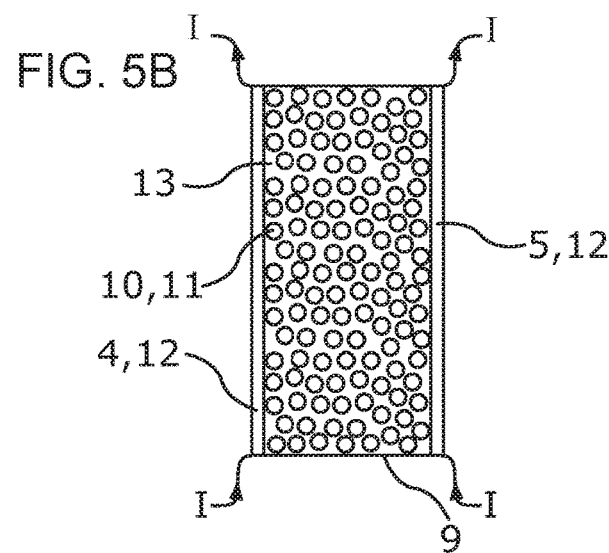
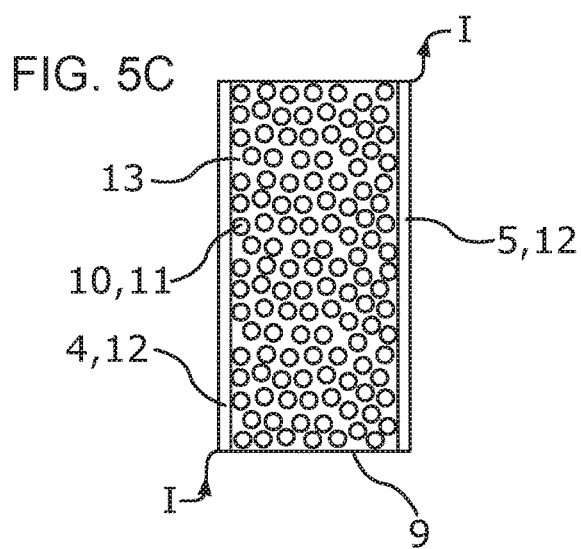
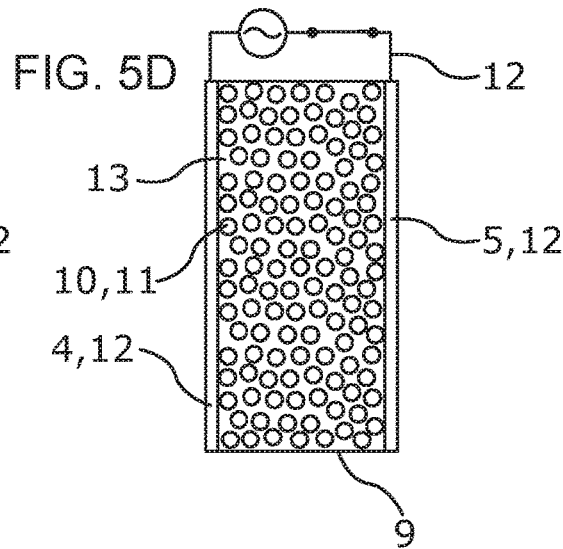
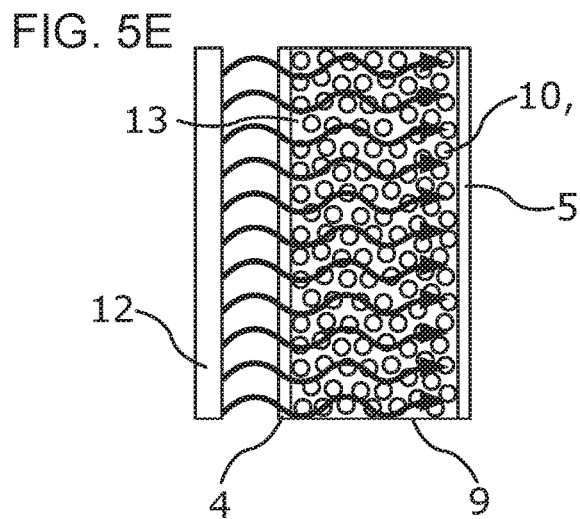
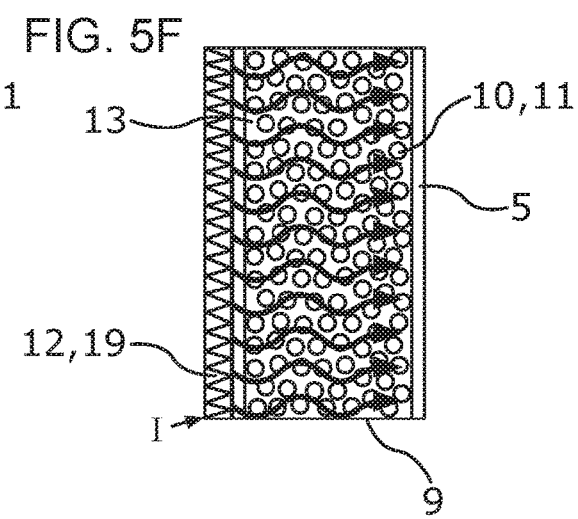

PLANAR LIGHT MODULATION APPARATUS HAVING SWITCHABLE MULTISTABLE TRANSMITTANCES AND/OR MULTISTABLE SCATTERING PROPERTIES WITH REGARD TO VISIBLE LIGHT

CROSS-REFERENCE TO RELATED APPLICATION

This application claims the priority, under 35 U.S.C. § 119, of German patent application DE 10 2017 214 093.3, filed Aug. 11, 2017; the prior application is herewith incorporated by reference in its entirety.

BACKGROUND OF THE INVENTION

Field of the Invention

The invention relates to a planar light modulation apparatus having switchable multistable transmittances and/or multistable scattering properties with regard to visible light. Furthermore, the present invention relates to a vehicle comprising such a planar light modulation apparatus.

The prior art discloses various technologies for realizing so-called switchable windows (for example switchable glazings, switchable mirrors, "smart glass"), in which the extent of light transmission (i.e. what proportion of the light can pass through the window) or the extent of light scattering (i.e. the opacity) of the window with regard to light visible to human beings can be altered by applying an electrical voltage.

Known representatives of these technologies are, for instance, electrochromic windows, "suspended-particle devices" (SPD) and "polymer-dispersed liquid crystal devices" (PDLC).

Electrochromic windows employ so-called electrochromic materials which reversibly change their optical properties (in particular transmission properties, color) upon their reduction and respectively oxidation, wherein the reduction and respectively oxidation are brought about by an electrical voltage being applied and by an electrical current flowing.

An electrochromic window is generally constructed from a first transparent planar substrate and a second transparent or reflectively embodied planar substrate, which is arranged substantially parallel to the first substrate and is spaced apart from the first substrate by a predetermined distance in order to form a space between them. The mutually facing sides of the two substrates are each provided with a transparent, electrically conductive coating (for example indium tin oxide or fluorine-doped tin oxide), which are connected to an electrical voltage source via electrical contacts. One of the two electrically conductive coatings is coated with a first electrochromic material and the other of the two electrically conductive coatings is coated with a so-called ion storage layer or a second electrochromic material, different than the first electrochromic material. These two coatings mentioned last are connected to one another by means of an ion-conducting electrolyte.

By applying an electrical voltage (for example in the range of 3 V to 5 V) to the transparent, electrically conductive coatings, it is possible for the transmission in the visible and near infrared range to be altered in a continuously variable manner, the transparent view being maintained. The respectively given or achieved extent of light transmission is maintained permanently or over a relatively long period of time often even without an applied electrical voltage. The switching time for complete coloration or decoloration of an electrochromic window is generally in the range of 2 to 10 minutes.

An SPD has a similar construction to an electrochromic window with regard to the substrates and the transparent, electrically conductive coatings, but a suspension composed of a medium that is liquid within a predetermined temperature range at atmospheric pressure and a predefinable concentration of insoluble particles dispersed in the liquid medium is arranged in the interspace between the two transparent, electrically conductive coatings. Provision can be made for the suspension to be embedded in the form of small droplets in a solid, generally polymeric matrix.

In the absence of an electrical AC voltage applied to the electrically conductive coatings, the often black particles in the suspension have a random spatial orientation in the liquid medium, as a result of which an SPD in this state is substantially nontransmissive (opaque) for visible light. By contrast, if an electrical AC voltage having a suitable magnitude is applied to the electrically conductive coatings, the particles become aligned along the electric field lines and the SPD becomes (more) light-transmissive. Upon the electrical AC voltage being reduced or switched off, an SPD again assumes a correspondingly lower degree of light transmissivity. An SPD can thus serve as a "light valve." The switching times of an SPD are only a few seconds.

In the case of a PDLC, small droplets of liquid crystal that are arranged in a solid, generally polymeric, matrix are arranged in the space between the electrically conductive coatings of the two substrates. Without an alternating electric field applied to the transparent, conductive layers of a PDLC, the liquid crystals in each of the droplets have a specific preferred direction which brings about a corresponding diffraction of visible light impinging on the droplet. However, since the preferred direction of the liquid crystals as viewed over the multiplicity of droplets is randomly (chaotically) distributed, in a state without voltage a PDLC results in light scattering, i.e. a PDLC is opaque and thus appears "like milk glass."

If an electrical AC voltage having a suitable magnitude is applied to the electrically conductive coatings of a PDLC, the liquid crystals in the droplets become aligned along the electric field lines and visible light can pass through the PDLC; the PDLC thus becomes transparent. Upon the electrical AC voltage being reduced or switched off, the transparency of a PDLC correspondingly decreases, i.e. a PDLC assumes its opaque state again upon the AC voltage being switched off. In the scattering, i.e. opaque, state, the majority of the incident light is transmitted diffusely, and only a very small part of the incident light is reflected or diffused back from the liquid crystal droplets. The switching times of a PDLC are typically only a few milliseconds.

Currently conventional switchable glazings that are based on the concepts of SPD or PDLC thus have a high transmittance or a high transparency only in a "switched-on state" and a low transmittance or an opaque appearance in the "switched-off state."

These properties of conventional SPD and PDLC are disadvantageous insofar, as on the one hand, electrical power is permanently required for maintaining a transparent, i.e. see-through, state and, on the other hand, this results in a lower operating reliability since such devices darken or become opaque independently within a short time (i.e. within a few seconds) upon failure of the applied electric field.

However, an operating behavior allowing the current extent of transparency to stay in the current state (in bistable or multistable fashion) without an externally applied electrical voltage would be advantageous for many applications. Although electrochromic windows exhibiting such a behavior are known, electrochromic windows require switching times in the range of a number of minutes, which is typically too long for many applications, for example for those in the field of motor vehicles.

SUMMARY OF THE INVENTION

Against this background, it is accordingly an object of the invention to provide a planar light-modulation apparatus which overcomes the above-mentioned and other disadvantages of the heretofore-known devices and methods of this general type and which provides for an improved light modulation apparatus comprising an optically active, switchable element, which light modulation apparatus is not just distinguished by short switching times but can also be used to achieve multistable transmittances and/or multistable scattering properties with regard to visible light. A further object of the present invention is to provide a vehicle, in particular a motor vehicle, comprising such a light modulation apparatus.

With the foregoing and other objects in view there is provided, in accordance with the invention, a planar light modulation apparatus, comprising:

a first planar substrate that is transparent for light having a wavelength in a range of 380 nm to 780 nm;

a second planar substrate that is reflective or is transparent for light having a wavelength in the range of 380 nm to 780 nm, the second substrate being disposed substantially parallel to the first substrate and spaced apart from the first substrate by a predetermined distance; and transparent, electrically conductive coatings respectively disposed on mutually facing sides of the first and second substrates;

electrical contacts for connecting the transparent, electrically conductive coatings to an electrical voltage source;

a light modulation element disposed within a space formed between the electrically conductive coatings, the light modulation element including a dielectric material having a predefined concentration of particles dispersed therein, which particles, provided that the particles are arranged randomly in the dielectric material, render the light modulation element nontransmissive for a predefinable proportion of light impinging thereon having a wavelength in the range of 380 nm to 780 nm or cause the light modulation element to appear opaque, wherein the dielectric material, up to a first temperature of 25° C. or higher at atmospheric pressure, is solid or has a viscosity of such a magnitude that the particles cannot change a current alignment in the dielectric material based on Brownian motion; and a heating device configured to heat the dielectric material to a second temperature, which is higher than the first temperature and at which the first dielectric material has a lower viscosity than at the first temperature, as a result of which the particles are enabled to alter an alignment thereof in the dielectric material based on Brownian motion.

According to the invention, a planar light modulation apparatus is specified which comprises a first planar substrate, which is transparent for light having a wavelength in the range of 380 nm to 780 nm, a second planar substrate, which is embodied in a reflective fashion or is transparent for light having a wavelength in the range of 380 nm to 780 nm and which is arranged substantially parallel (i.e. completely parallel or at an angle of up to approximately 1°) to the first substrate and is spaced apart from the first substrate by a predetermined distance (for example in the region of 5 µm, 6 µm, 7 µm, 8 µm, 9 µm, 10 µm, 15 µm, 20 µm, 25 µm, 30 µm, 60 µm, 90 µm, 120 µm, 140 µm); and a respective transparent, electrically conductive coating on the mutually facing sides of the two substrates, wherein the transparent, electrically conductive coatings are connectable to an electrical voltage source by means of at least respectively one electrical contact.

A light modulation element (having a thickness of, for example, in the region of 5 µm, 6 µm, 7 µm, 8 µm, 9 µm, 10 µm, 15 µm, 20 µm, 25 µm, 30 µm, 60 µm, 90 µm, 120 µm, 140 µm) is arranged in the space between the electrically conductive coatings, said light modulation element comprising: a first dielectric material having a predefinable concentration of particles dispersed therein, which particles, provided that they are arranged randomly in the first dielectric material, make the light modulation element nontransmissive for a predefinable proportion of the light impinging thereon having a wavelength in the range of 380 nm to 780 nm (for example do not allow a proportion in the range of 80% to 100%, i.e. 100%, 99%, 98%, 97%, 96%, 95%, 94%, 93%, 92%, 91%, 90%, 89%, 88%, 87%, 86%, 85%, 84%, 83%, 82%, 81% or 80% of the impinging light having a wavelength in the range of 380 nm to 780 nm to pass through the light modulation element) or cause the light modulation element to appear opaque, wherein the first dielectric material, up to a first temperature of 25° C. or higher at atmospheric pressure, is solid or has a viscosity of such a magnitude that the particles cannot alter their current alignment in the first dielectric material on the basis of Brownian motion.

The light modulation apparatus additional comprises a heating device, by means of which the first dielectric material can be heated to a second temperature, which is higher than the first temperature and at which the first dielectric material has a lower viscosity than at the first temperature, as a result of which the particles can alter their alignment in the first dielectric material on the basis of Brownian motion.

The invention here is based on the insight that by using a first dielectric material surrounding the mobile particles, which first dielectric material is solid or has a high viscosity at temperatures within (if appropriate defined) normal operation (for example from −20 to +85° C. in the case of a motor vehicle), the particles dispersed in the dielectric material stay in a given alignment relative to the substrates during normal operation and the extent of transmission of light or opacity that corresponds to this state can be maintained in a stable manner for a longer time independently of an applied electrical voltage. If there is for instance a high transmittance or low opacity during normal operation, in the case of the light modulation apparatus according to the present invention the extent of transmission of light or opacity corresponding to this state in normal operation is maintained independently of an applied electrical voltage in any case for significantly longer (for instance in the range of a number of minutes through a number of hours to a number of days) than is the case for conventional PDLC and SPD.

The extent of transmission or opacity can be altered, however, if the first dielectric material is warmed or heated beyond a critical temperature (i.e. the first temperature) (i.e. to at least the second temperature) at which the viscosity of the first dielectric material decreases to an extent such that the alignment of the particles in the first dielectric material can be controlled by means of an electric field applied to the light modulation apparatus, or the particles without an applied electric field become arranged chaotically (randomly) in the dielectric material on the basis of their Brownian motion.

If, by way of example, proceeding from a random arrangement of the particles in the first dielectric material, the temperature of the first dielectric material is increased at least to the second temperature and, in this state, an alternating electric field of sufficient strength and duration is applied to the dielectric material, the particles become aligned in the direction of the electric field lines and the light modulation apparatus becomes (more) transparent or (more) see-through for light having a wavelength in the range of 380 nm to 780 nm or its opacity decreases.

By means of a corresponding control of the strength and/or duration of the alternating electric field, if appropriate in combination with a corresponding control of the magnitude of the temperature (particularly if the degree of viscosity of the first dielectric material can be influenced thereby), it is also possible to achieve intermediate stages with regard to the extent of light transmissivity or the extent of opacity of the light modulation apparatus. Therefore, the control device, which can be provided in accordance with preferred developments of the invention, can also be configured to control the strength of the alternating electric field, and/or the AC voltage source, which can likewise be provided in accordance with preferred developments of the invention, is able to generate alternating electric fields of different strengths.

If, after reaching the desired extent of light transmissivity or extent of opacity of the light modulation apparatus, the temperature of the light modulation element is reduced below the first temperature and if the electrical circuit is opened only afterward, then the particles stay in the aligned state and the achieved extent of light transmissivity or extent of opacity is maintained (stable state).

If, in this state, the temperature of the first dielectric material were raised again to or above the second temperature without the electrical circuit being closed again, then the particles in the first dielectric material would become aligned chaotically (randomly) again and the light modulation apparatus would again assume its "darkened" or opaque state.

Consequently—in contrast to the known SPD and PDLC—with the light modulation apparatus according to the invention it is possible to achieve stable (bi- or multistable) transmittances and/or multistable scattering properties with regard to visible light without the maintenance of a transparent of "bright" state necessitating that an electrical voltage be applied to the light modulation apparatus and/or electrical current be consumed for this purpose.

This also results in an increased operating reliability in comparison with known SPD and PDLC since, with the exception of the time periods—which as a general rule are only short—in which the first dielectric material is heated to a second temperature or higher, no sudden darkening or increase in the extent of opacity (extent of transparency) of the light modulation apparatus according to the invention can occur upon a failure of the voltage source or an interruption of the connection to the voltage source.

A further advantage afforded is that, in comparison with known SPD and PDLC, the extent of transmission or the extent of opacity can be altered rapidly even at low ambient temperatures. At low temperatures, conventional SPD and PDLC react only very sluggishly or do not react at all, which is caused by an increase in the viscosity of the medium surrounding the particles at low temperatures.

By contrast, the heating device provided according to the invention enables the first dielectric material to be rapidly heated, independently of the ambient temperatures, to the second temperature or higher, at which the first dielectric material has the low viscosity required for a rapid switching process. According to the present invention, a "rapid switching process" is understood to mean a switching process in which, after attaining at least the second temperature of the first dielectric material, a process of complete "decoloration"—within the scope of what is technically possible—or a complete elimination of an opaque state of the light modulation element proceeding from a completely "colored" or completely opaque state is achieved within a maximum of 30 seconds, preferably within 20 seconds, particularly preferably within 10 seconds. Rapid switching processes of this type can be realized by means of the planar light modulation apparatus according to the present invention.

Provision can be made for an opposite process to require a longer time duration, for example approximately 40 seconds, 50 seconds, 60 seconds, 2, 3, 4, 5, 6, 7, 8, 9 or 10 minutes.

In accordance with one advantageous development of the light modulation apparatus the light modulation element arranged in the space between the electrically conductive coatings comprises a second dielectric material, in which the first dielectric material having the predefinable concentration of particles dispersed therein is present in a manner dispersed in the form of a multiplicity of inclusions, wherein the second dielectric material, up to a third temperature, which is higher than the second temperature, at atmospheric pressure, is solid or has such a high viscosity that the inclusions of first dielectric material cannot alter their position within the second dielectric material.

Upon an alteration of the viscosity of the first dielectric material (which can extend through to a phase transition from solid to liquid or from liquid to solid), an alteration of the mass density, the electrical properties, etc. can often be observed at the first dielectric material.

In order to minimize the influence of this (these) change (s), in accordance with the first advantageous development of the light modulation apparatus, provision is made for the first dielectric material with the particles dispersed therein to be included in a multiplicity of small spheres that are enclosed by a second dielectric material. In this case, the second dielectric material has scarcely variable properties up to the second temperature and beyond; in particular, up to and beyond said second temperature, said second dielectric material remains solid or has such a high viscosity that the inclusions of first dielectric material cannot alter their position within the second dielectric material.

In principle, it is already known, in SPD and PDLC, to provide small liquid-filled inclusions or spheres dispersed in a solid matrix. Against this background, with regard to the size (for example in the range of 0.25 µm to 2 µm), size distribution, concentration (mass concentration), etc. of the inclusions or spheres, it is possible to have recourse to the technical teachings known from the prior art. Moreover, it is known from the prior art and should be taken into account for the present invention that the refractive index of the matrix material (here of the second dielectric material) should correspond as much as possible to that of the inclusions or spheres (here the inclusions or spheres comprising the first dielectric material and the particles dispersed therein).

In accordance with a further advantageous development of the light modulation apparatus according to the invention, said light modulation apparatus furthermore comprises an electrical AC voltage source, which is connected to the two transparent, electrically conductive coatings by means of the electrical contacts, wherein a switching device is provided between one of the electrical contacts and the electrical AC voltage source, by means of which switching device the electrical circuit can be closed and opened. Furthermore, the light modulation apparatus comprises a control device, which is connected to the switching device and the heating device, wherein the control device is configured at least to the effect of:

being able to switch on the heating device in order to heat the first dielectric material to the second temperature or higher and to keep said first dielectric material at the second temperature or higher for a predefinable time duration; or being able to switch on the heating device in order to heat the first dielectric material to the second temperature or higher and to keep said first dielectric material at the second temperature or higher for a predefinable time duration, and of closing the electrical circuit between the two transparent, electrically conductive coatings and the electrical AC voltage source at least for the predefinable time duration by means of the switching device.

The control device can be an electrical or electronic control device. Moreover, the control device can be realized in the form of a digital computing device or in the form of a program code executable on a digital computing device. The control device can be a discrete device or the latter can be part of a device which also performs further tasks.

Provision can be made for the control by the control device to be able to be started and stopped manually, semiautomatically or automatically, for instance manually or semiautomatically (for example by means of a switch, rotary or sliding controller, a joystick, by means of voice control, etc.) on the basis of a desire of an occupant of a vehicle provided with a light modulation apparatus, semiautomatically or automatically depending on an (optionally predefinable) brightness value in the interior of a vehicle, semiautomatically or automatically depending on a parked state of a vehicle (for example automatic darkening of one or more light modulation apparatus of a vehicle upon the doors thereof being locked from outside and/or upon an optionally predefinable temperature being reached or exceeded in the interior of a vehicle that is not in operation), and/or manually, semiautomatically or automatically when a vehicle is started up (for example setting of the highest possible degree of transparency or the lowest possible opacity when a vehicle is started up). It goes without saying that these examples should not be understood to be exhaustive.

The switching device is a switching device in which switching processes can be carried out by means of a corresponding driving (for instance with the aid of electrical, electronic, optical, electromagnetic signals, etc.). The control device is configured to be able to transmit corresponding signals to the switching device. If appropriate, the switching device can generate feedback signals (confirmations, fault messages, status messages, etc.) and transmit them to the control device, wherein in such a case the control device is configured to receive and, if appropriate, to process these feedback signals.

In accordance with yet another advantageous development of the light modulation apparatus, the first temperature is a temperature in the range of 50° C. to 120° C., in particular 50° C., 55° C., 60° C., 65° C., 70° C., 75° C., 80° C., 85° C., 90° C., 95° C., 100° C., 105° C., 110° C., 115° C. or 120° C.

It is furthermore advantageous if, in the case of the light modulation apparatus, the second temperature is a temperature which is in the range of 1° C. to 50° C. higher than the first temperature, wherein the second predefined temperature is preferably 1° C., 2° C., 5° C., 10° C., 15° C., 20° C., 25° C., 30° C., 35° C., 40° C., 45° C. or 50° C. higher than the first predefined temperature.

The separation between the first temperature and the second temperature can be large or small to varying extents depending on the type of first dielectric material. By way of example, the difference between T1 and T2 can be just one degree Celsius if the first dielectric material transitions for example from a solid state directly to a melt, that is to say has a defined melting point. In such a case, the viscosity of the first dielectric material can vary significantly within just one degree Celsius (or within just a few degrees Celsius, for instance 2° C., 3° C. or 4° C.). However, if the first dielectric material has a wide temperature range in which a softening of the material gradually takes place, it is expedient for the purpose of rapid switching times to heat the first dielectric material to a temperature significantly above the glass transition temperature given for the first dielectric material, in order to achieve a suitably low viscosity of the first dielectric material, that is to say here to choose a greater separation between the first and second temperatures.

If the light modulation apparatus comprises a second dielectric material, then advantageously the third temperature is a temperature which is in the range of 5° C. to 50° C. higher than the second temperature, in particular a temperature which is 5° C., 10° C., 15° C., 20° C., 25° C., 30° C., 35° C., 40° C., 45° C. or 50° C. higher than the second predefined temperature. The greater the separation between the second and third temperatures, the more simply the light modulation element can be prevented from being inadvertently heated to the third temperature, which might result in destruction or impairment of the light modulation apparatus.

The required first, second and, if appropriate, also third temperatures can be dependent on the intended use of the light modulation apparatus, i.e. on the temperature conditions respectively given during normal operation. By means of a suitable choice of first and, if appropriate, second dielectric material, it is possible to take account of the temperature requirements respectively given or to predefine suitable first, second and, if appropriate, also third temperatures.

The heating device of the light modulation apparatus is preferably configured in the form of a planar, electrical resistance heating system in such a way that an electrical surface current can be conducted through one or both of the transparent, electrically conductive coatings; or configured the heating device is configured in the form of a planar, electrical resistance heating system in such a way that an electrical volume current can be conducted through the light modulation element by means of the two transparent, electrically conductive coatings; or configured to apply an AC voltage coordinated with the first dielectric material, wherein the frequency of the AC voltage corresponds to the resonant frequency of the orientation polarization of the first dielectric material or deviates therefrom only by a predefinable small value (for example +/−1%, +/−2%, +/−3%, +/−4%, +/−5%); or configured to heat at least the light modulation element by means of microwave radiation, infrared radiation or y radiation, wherein the respective radiation is radiated onto the light modulation element either from outside the light modulation apparatus or by means of at least one waveguide arranged between the first substrate and the second substrate.

In the case of the light modulation apparatus according to the present invention, the first dielectric material can be for example at least one thermoplastic, in particular an acrylonitrile-butadiene-styrene (ABS), a polyamide (PA), a polylactate (PLA), a polymethyl methacrylate (PMMA), a polycarbonate (PC), a polyethylene terephthalate (PET), a glycol-modified polyethylene terephthalate, a polyethylene (PE), a polypropylene (PP), a polystyrene (PS), a polyether ether ketone (PEEK), a polyvinyl chloride (PVC), a celluloid, an acrylic resin, a polymethyl methacrylate, a polyurethane, a polycaprolactone, a polylactide, a polyvinylidene fluoride, a polyvinyl acetal, in particular a polyvinyl formal or a polyvinyl butyral, a polyvinyl alcohol, a polyethylene glycol, in particular a polyethylene glycol having a molar mass in the range of 1000 to 35 000; a polymeric perfluoroether; a silicone; a siloxane; a paraffin; a stearin; or a mixture of two or more thereof.

In the case of the first dielectric material, care should be taken to ensure that, up to a first temperature (for normal operation) that is desired or required or specified for the respective application purpose, said first dielectric material has a sufficient strength or such a high viscosity that the particles dispersed in it cannot alter their current alignment in the first dielectric material on the basis of Brownian motion. The fact of whether these requirements are met can be discovered for each candidate for the first dielectric material by means of a few experiments. In a corresponding manner, the second temperature can also be determined by means of a few experiments.

The second dielectric material can advantageously be at least one thermoplastic, elastomeric or thermosetting polymer. Depending on the chosen production method for the light modulation apparatus, it may be necessary for the second dielectric material to be immiscible with the first dielectric material, if appropriate also with the particles dispersed therein. The third temperature for the second dielectric material can also be determined by means of a few experiments.

In the case of the light modulation apparatus, the particles dispersed in the first dielectric material can advantageously be selected from the group consisting of organic or inorganic particles, in particular composed of polyhalogen compounds, organic or inorganic pigments, metal particles, crystals, crystallites and liquid crystals and of mixtures of at least two different particles of this type.

With regard to the type of particles dispersed in the first dielectric material, it is also possible to have recourse to the corresponding prior art that is known with respect to conventional SPD and PDLC.

It is known from the field of the conventional SPD that particles having a largest extent of a maximum of 1 micrometer are preferably used there, preferably those having a largest extent of a maximum of 0.2 micrometer (i.e. having a largest extent corresponding to half the wavelength of blue light) in order to avoid excessive scattering of light having a wavelength in the range of 380 nm to 780 nm. It is known moreover from the field of the PDLC that particles on the μm scale, i.e. particles having a largest extent of more than 1 micrometer, are expedient for sufficient light scattering. This technical teaching known from the prior art can also be taken into account in the present invention.

The light modulation apparatus can advantageously also be developed to the effect that the light modulation apparatus comprises at least one temperature measuring device for measuring the temperature of the light modulation element or of the light modulation apparatus, wherein the temperature measuring device is connected to the control device; and the control device is configured to monitor the temperature of the light modulation element or of the light modulation apparatus and to close the electrical circuit between the two transparent, electrically conductive coatings and the electrical AC voltage source by means of the switching device as long as the temperature of the light modulation element or of the light modulation apparatus is greater than the first temperature.

Advantageously, one or both transparent, electrically conductive coating(s) can be provided as temperature measuring device, wherein the temperature measurement is carried out on the basis of its/their respective temperature-dependent electrical conductivity. It goes without saying that one or a plurality of temperature measuring devices different therefrom can also be provided.

Providing a temperature measuring device makes it possible to ensure that the light modulation apparatus maintains a (relatively) transparent or non-opaque state even if, by way of example, on account of a high ambient temperature or a high radiation exposure (for example by means of sunrays) in the light modulation apparatus or the light modulation device a temperature is reached at which a reduction of the viscosity of the first dielectric material cannot be ruled out at least in the near future, which is the case starting from an overshoot of the first temperature.

In such a case, in accordance with this development of the light modulation apparatus, the electrical circuit is closed, such that no (undesired or even dangerous) darkening (reduction of the transmittance) or increase in the extent of opacity of the light modulation element or of the light modulation apparatus can occur upon the second temperature being reached.

Moreover, with the aid of a temperature measuring device in the case of heating of the first dielectric material with the aid of the heating device to a second temperature or higher by means of the control device it is possible to monitor whether or when, after the switching off of the heating device, the light modulation device or the light modulation apparatus has again reached the first temperature or lower and the electrical circuit can be opened by the control device only afterward.

Without a temperature measuring device, the electrical circuit can be opened after a predefinable time duration after the heating device has been switched off, wherein the predefinable time duration is chosen such that the light modulation apparatus or the light modulation element has typically already been cooled down to the first temperature or lower.

Furthermore, with the aid of a temperature measuring device, it is possible to monitor the temperature of the light modulation device or of the light modulation apparatus upon desired heating of the first dielectric material by means of the heating device to a second temperature or higher by means of the control device and the electrical circuit can be closed by the control device only if it is detected by means of the temperature measuring device that the temperature of the light modulation apparatus or of the light modulation element has come close to within a predefinable separation from the second temperature, for example has reached the first temperature.

Furthermore, it is advantageous if in the case of the light modulation apparatus the first and/or the second planar substrate are/is formed from a glass or plastic (for instance a polyethylene terephthalate (PET) or a polycarbonate (PCA)) that is transparent for light having a wavelength in the range of 380 nm to 780 nm; and/or the transparent, electrically conductive coatings are formed from indium tin oxide or fluorine-doped tin oxide; and/or the light modulation apparatus comprises one or more intermediate layers, in particular composed of a polyethylene terephthalate or an ethylene vinyl acetate, between the first and/or the second planar substrate.

Furthermore, the light modulation apparatus can comprise further elements, for instance ones for improving scratch resistance, UV resistance, for preventing the agglomeration of the particles in the low-viscosity state of the first dielectric material, etc.

The light modulation apparatus according to the present invention can be used wherever conventional SPD and PDLC are also used or provided, for instance as glazing, windows and roof windows of buildings of all kinds, as windows of vehicles of all kinds (land vehicles, aircraft, space vehicles, watercraft, rail vehicles, motor vehicles, etc.), as mirrors (comprising a reflectively embodied second substrate), as spectacle lenses, etc.

The light modulation apparatus can be embodied in all suitable sizes, in plane (flat) or curved fashion, wherein in particular a curvature about two axes such as is often encountered for instance in vehicle construction (in particular in motor vehicles) can also be realized.

The present invention also encompasses a vehicle, in particular a motor vehicle, which is characterized in that it comprises at least one light modulation apparatus in accordance with one of the embodiments mentioned above. The term "vehicle" is not restricted to motor vehicles, but also encompasses all other vehicles mentioned above.

In the case of the vehicle, provision can be made for the at least one light modulation apparatus to be provided in a windshield, a front side window, a rear side window, a rear window, a floor window and/or a roof window.

Other features which are considered as characteristic for the invention are set forth in the appended claims.

Although the invention is illustrated and described herein as embodied in a planar light modulation apparatus having switchable multistable transmittances and/or multistable scattering properties with regard to visible light, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 5A-5F shows several cross sectional views of various examples of a light modulation element according to the present invention, in each case with a heating device.

DETAILED DESCRIPTION OF THE INVENTION

The exemplary embodiments discussed below are preferred embodiments of the invention. In the exemplary embodiments, the described components of the embodiments each represent individual features of the invention which are to be considered independently of one another, each also refine the invention independently of one another and are therefore also to be considered to be a component of the invention individually or in a combination other than that shown. Furthermore, the described embodiments may also be supplemented by further features of the invention that have already been described.

In the figures, functionally identical elements are in each case provided with the same reference signs. The figures are not true to scale.

Overall, the figures show how a planar light modulation apparatus having switchable multistable transmittances and/or multistable scattering properties with regard to visible light (and optionally also with regard to light in the infrared range) can be provided by means of the invention.

Figure 1:
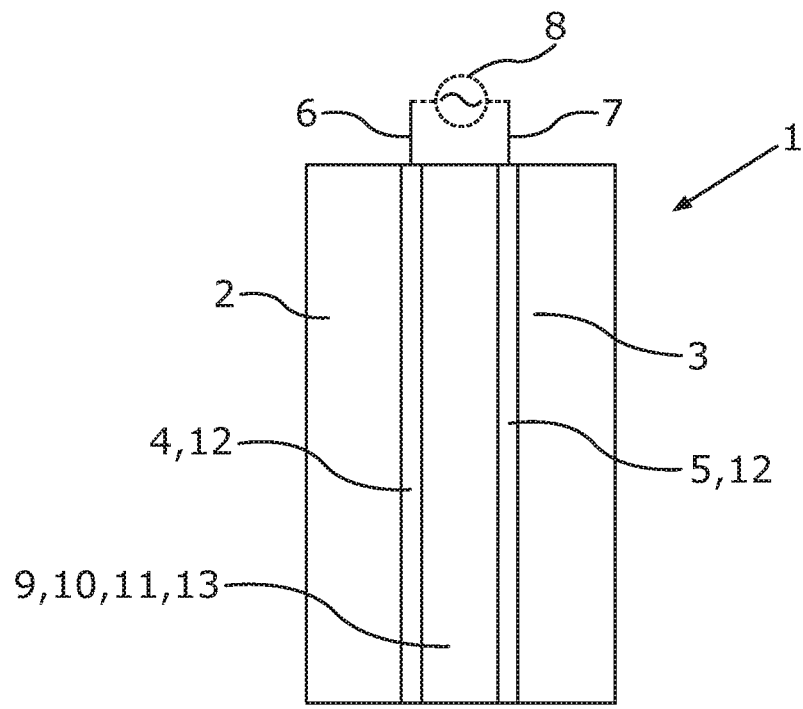
FIG. 1 is a cross sectional view of a first exemplary embodiment of a construction of a light modulation apparatus according to the present invention.
Figure 2:
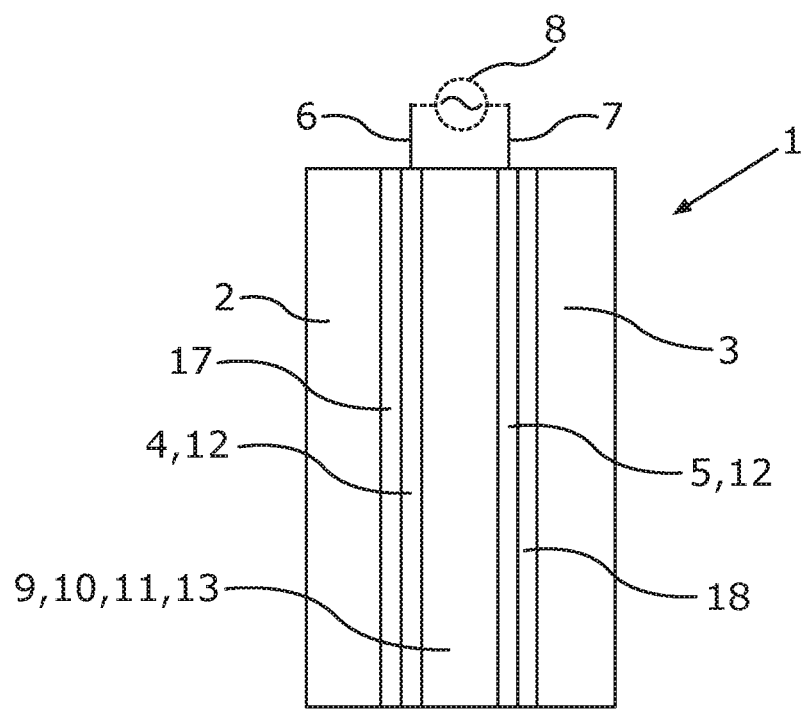
FIG. 2 is a cross sectional view of a second exemplary embodiment of a light modulation apparatus according to the present invention.

FIGS. 1 and 2 schematically illustrate respectively an example of a planar light modulation apparatus 1 according to the present invention. As is shown in FIG. 1, the light modulation apparatus 1 comprises a first planar substrate 2, which is transparent for light having a wavelength in the range of 380 nm to 780 nm, a second planar substrate 3, which is embodied in a reflective fashion or is transparent for light having a wavelength in the range of 380 nm to 780 nm and which is arranged substantially parallel to the first substrate 2 and is spaced apart from the first substrate 2 by a predetermined distance; and a respective transparent, electrically conductive coating 4, 5 on the mutually facing sides of the two substrates 2, wherein the transparent, electrically conductive coatings 4, 5 are connectable to an electrical voltage source 8 by means of at least respectively one electrical contact 6, 7.

The first substrate 2 and/or the second substrate 3 can be formed from a glass or plastic (for instance a polyethylene terephthalate (PET) or a polycarbonate (PCA)) which is transparent for light having a wavelength in the range of 380 nm to 780 nm. If the light modulation apparatus 1 is intended to serve as a mirror, one of the substrates 2, 3 (i.e. the substrate 2, 3 which is the "rear" substrate in relation to the direction of light incidence) is provided with a specularly reflective coating. The first substrate 2 and the second substrate 3 can have any suitable or required thickness (for instance taking account of the size and/or the expected mechanical loading during the use of the light modulation apparatus 1, etc.) and the first substrate 2 and the second substrate 3 can have a different thickness.

Insofar as the expression "transparent [ . . . ] of 380 nm to 780 nm" is used in the present description, this expression can optionally also mean "of 380 nm to 780 nm or longer", i.e. this expression can optionally also encompass such substrates 2, 3 which are also transparent or partly transparent for light in the wavelength range of infrared light (in particular near infrared light in the wavelength range starting from 780 nm to approximately 3000 nm). However, the present invention also encompasses such substrates 2, 3 which, for instance on account of their constitution or by means of corresponding additives, are nontransmissive for light in the wavelength range of greater than 780 nm, that is to say in which the passage of thermal radiation through them is blocked.

The use of glass as first substrate 2 and/or as second substrate 3 is advantageous insofar as glass has a relatively low thermal conductivity, such that—as is explained below—with the use of a heating device 12 arranged between the first substrate 2 and the second substrate 3 low heat losses occur and at the same time a high degree of heating of the outwardly facing glass surface(s) can be avoided.

The transparent, electrically conductive coatings 4, 5 can be formed from any material suitable for this purpose, for example from indium tin oxide or fluorine-doped tin oxide.

The transparent, electrically conductive coatings 4, 5 each have an electrical, as a general rule metallic, contact 6, 7, by means of which the coatings 4, 5 are connectable to an electrical voltage source, which is an electrical AC voltage source 8 in the embodiment shown.

A light modulation element 9 is arranged in the space between the electrically conductive coatings 4, 5. As is explained in greater detail below, the light modulation element 9 comprises a first dielectric material 10 having a predefinable concentration of particles 11 dispersed therein, which particles, provided that they are arranged randomly in the first dielectric material 10, make the light modulation element 9 nontransmissive for a predefinable proportion of the light impinging thereon having a wavelength in the range of 380 nm to 780 nm or cause the light modulation element 9 to appear opaque, wherein the first dielectric material 10, up to a first temperature T1 of 25° C. or higher at atmospheric pressure, is solid or has a viscosity of such a magnitude that the particles 11 cannot alter their current alignment in the first dielectric material 10 on the basis of Brownian motion.

As is likewise explained in greater detail below, the first dielectric material 10 can be heated by means of the heating device 12 to a second temperature T2 which is higher than the first temperature T1 and at which the first dielectric material 10 has a lower viscosity than at the first temperature T1, as a result of which the particles 11 can alter their alignment in the first dielectric material 10 on the basis of Brownian motion.

As a general rule the thickness of the light modulation element 9 is in the µm range (for instance in the range of 5 µm to 140 µm), which is advantageous not only with regard to the amount of material required for the light modulation element 9 but also with regard to the energy requirement and thus in general also with regard to the time duration required for heating the light modulation element 9 to the second temperature T2. Given an assumed weight per unit area of approximately 10 g/m$^2$ for the light modulation element 9, this results in an energy requirement of approximately 0.2 Wh, to heat 1 m$^2$ of the light modulation element 9 by 100° C. If heating is carried out using an electrical power of approximately 1 kW, a light modulation element 9 having an area of 1 m$^2$ can be heated by 100° C. within a time duration of less than 1 second (for example 800 ms).

The light modulation element 9 can additionally comprise a second dielectric material 13, in which the first dielectric material 10 having the predefinable concentration of particles 11 dispersed therein is present in a manner dispersed in the form of a multiplicity of inclusions, wherein the second dielectric material 13, up to a third temperature T3, which is higher than the second temperature T2, at atmospheric pressure, is solid or has such a high viscosity that the inclusions of first dielectric material 10 cannot alter their position within the second dielectric material 13.

As is illustrated schematically in FIG. 2, the light modulation apparatus 1 can furthermore comprise one or a plurality of intermediate layers 17, 18 which are formed for instance from a polyethylene terephthalate or an ethylene vinyl acetate and which are arranged between the first planar substrate 2 and/or the second planar substrate 3. Intermediate layers 17, 18 of this type are already known in principle and known intermediate layers that are suitable for the present purpose can also be used in the case of the light modulation apparatus 1 according to the present invention.

The light modulation element 9 can be constructed in various ways. As is illustrated schematically and by way of example in FIG. 3, the light modulation element 9 in accordance with a first embodiment can comprise the first dielectric material 10 with a predefinable concentration of particles 11 dispersed therein.

Figure 3:
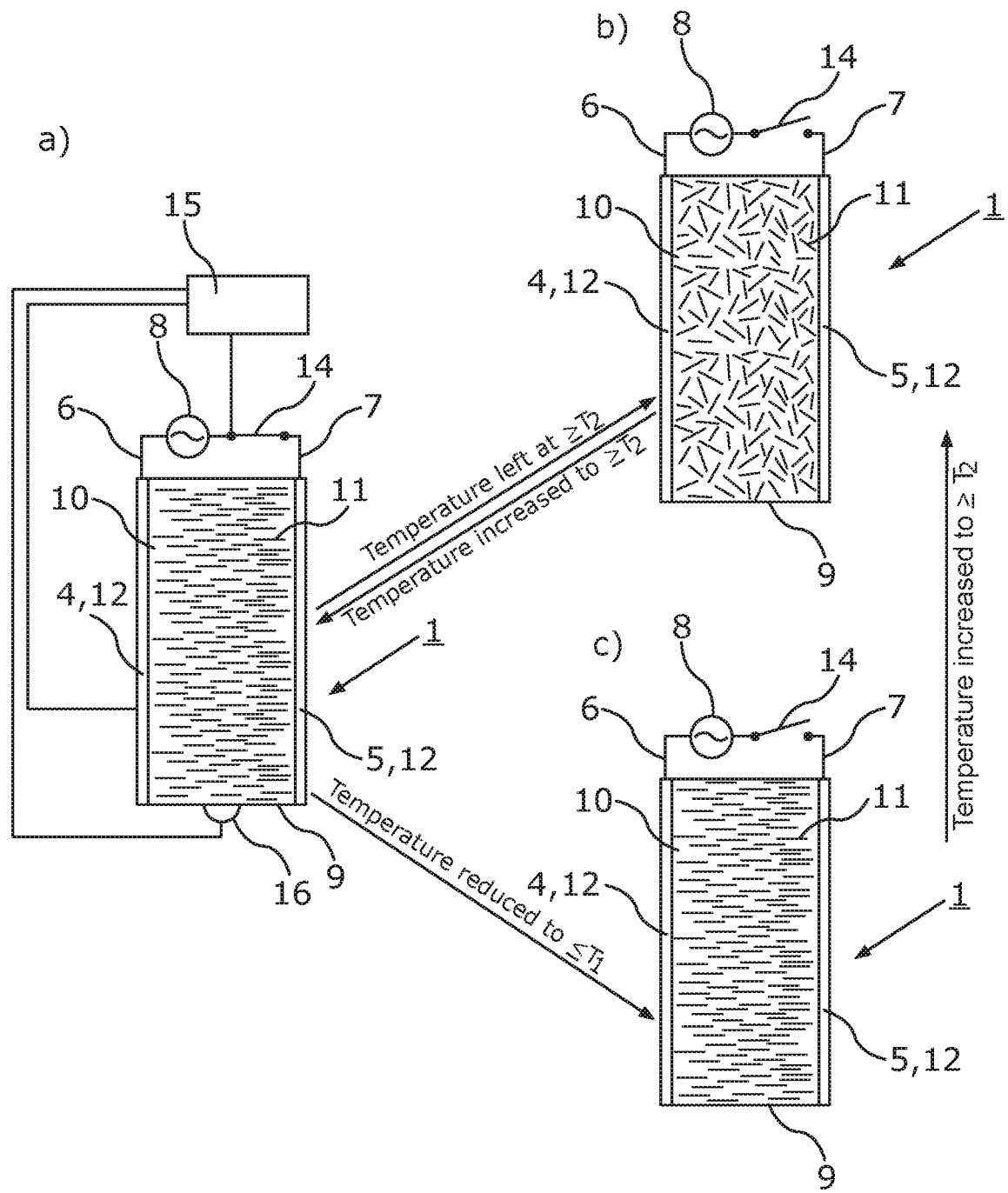
FIG. 3 shows a first example for operating the light modulation apparatus.

The "chaotic" alignment of the particles 11 in the first dielectric material 10 illustrated in FIG. 3 b) (like the illustration also in FIG. 4 b)) should be understood such that the particles 11 are arranged randomly in all spatial directions in the first dielectric material 10.

The particles 11 preferably have anisotropic properties, i.e. are shaped for instance as small rods or in an acicular fashion, as platelets, as disks, in a cylindrical fashion, in a prismatic fashion, etc. and/or have an electrical or dielectric anisotropy or an anisotropy with respect to the polarizability.

This affords the advantage that, when a sufficiently strong alternating electric field is present, the particles 11 can become aligned particularly well and rapidly along the electric field lines provided that the viscosity of the first dielectric material 10 is sufficiently low.

Figure 4:
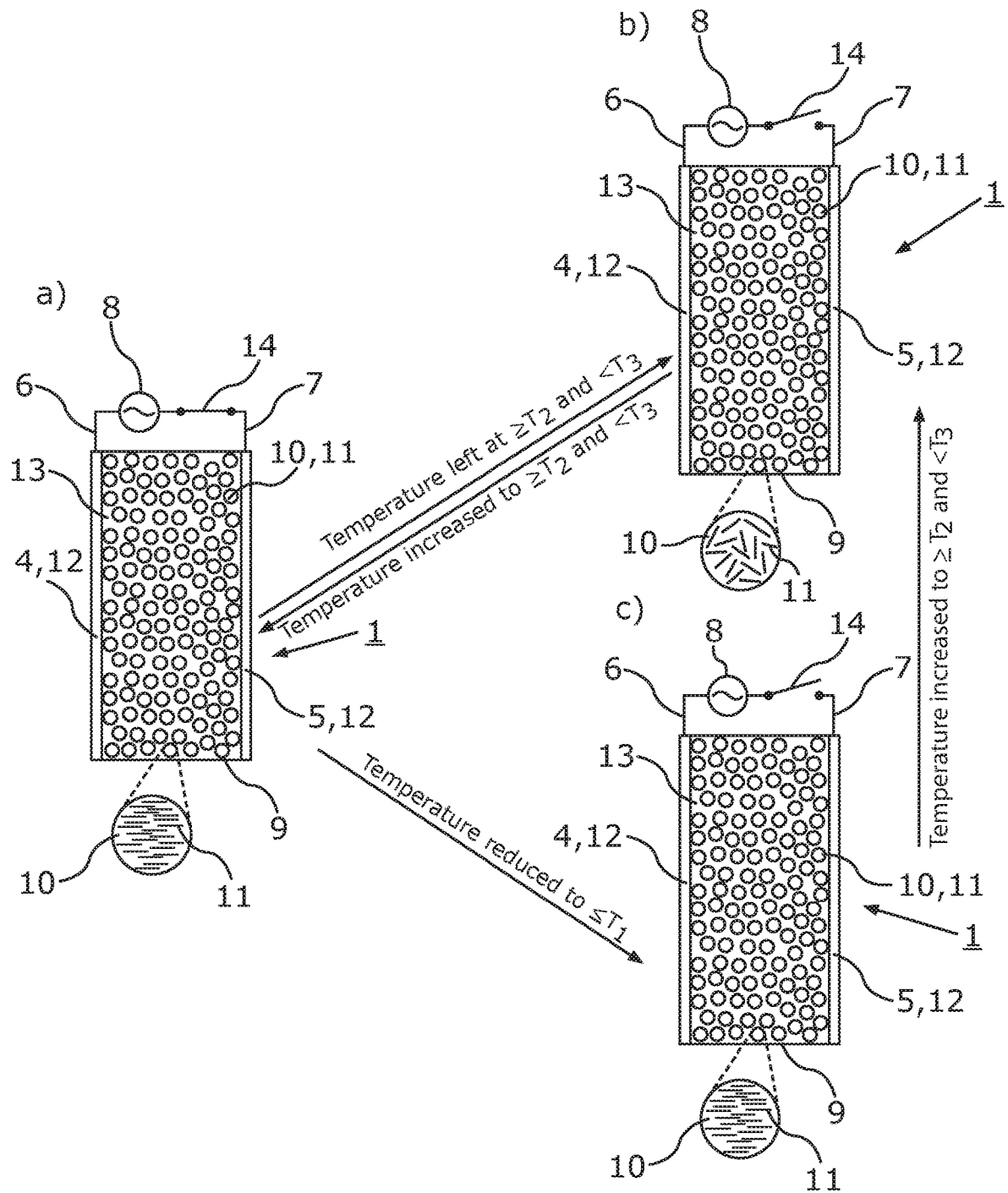
FIG. 4 shows a second example for operating the light modulation apparatus.

In FIGS. 3 and 4, the light modulation apparatus 1 are illustrated without the first substrate 2 and the second substrate 3 merely for the sake of clarity. Likewise for the sake of clarity, only FIG. 3 a) illustrates the light modulation apparatus 1 with a control device 15 and an optional temperature measuring device 16. In order to carry out the method sequences illustrated in FIGS. 3 b), 3 c), 4 a), 4 b) and 4c), however, at least the control device 15 is also provided in the case of the light modulation apparatus 1 illustrated in these figures, too, said control device being connected to a switching device 14 and the heating device 12.

The switching device 14 is arranged between one of the electrical contacts 6, 7 and the electrical AC voltage source 8, whereby the electrical circuit can be closed and opened. In the embodiment shown, the switching device 14 is arranged between the contact 7 and the electrical AC voltage source 8.

The control device 15 is configured to the effect of:
being able to switch on the heating device 12 in order to heat the first dielectric material 10 to the second temperature T2 or higher and to keep said dielectric material at the second temperature T2 or higher for a predefinable time duration; or
being able to switch on the heating device 12 in order to heat the first dielectric material 10 to the second temperature T2 or higher and to keep the first dielectric material 10 at the second temperature T2 or higher for a predefinable time duration, and of closing the electrical circuit between the two transparent, electrically conductive coatings 4, 5 and the electrical AC voltage source 8 at least for the predefinable time duration by means of the switching device 14.

In embodiments comprising a temperature measuring device 16, the latter is configured for measuring the temperature of the light modulation element 9 or of the light modulation apparatus 1 and is connected to the control device 15. In these embodiments, the control device 15 can be configured to monitor the temperature of the light modulation element 9 or of the light modulation apparatus 1 and to close the electrical circuit between the two transparent, electrically conductive coatings 4, 5 and the electrical AC voltage source 8 by means of the switching device 14 as long as the temperature of the light modulation element 9 or of the light modulation apparatus 1 is greater than the first temperature T1.

Insofar as the transparent, electrically conductive coatings 4, 5 are additionally provided with the reference sign 12 in FIGS. 1 to 4, this expresses the fact that they are in any case transparent, electrically conductive coatings 4, 5 which, however, can merely optionally also serve as heating device 12. Insofar as the further reference signs 10, 11 and 13 are used for the light modulation elements 9 in FIGS. 1 and 2, this expresses the fact that the light modulation elements 9 always comprise the first dielectric material 10 with the particles 11 dispersed therein, but the second dielectric material 13 can optionally also be present.

In the case of the light modulation apparatus 1 according to the present invention, any suitable heating device 12 can be provided by means of which of which the first dielectric material 10 can be heated to the second temperature T2 or higher at which the first dielectric material 10 assumes a lower viscosity than at the first temperature T1, in such a way that the particles 11 can alter their alignment in the first dielectric material 10 on the basis of Brownian motion.

Preferred examples of heating devices 12 are illustrated in FIG. 5. FIG. 5 shows a light modulation element 9 comprising both a first dielectric material 10 and a second dielectric material 13. It goes without saying that the heating devices 12 shown are also provided or usable in the cases in which only the first electric material 10 with the particles 11 dispersed therein is present, such as is shown for instance in FIG. 3.

Highly local heating of the light modulation element 9 or of the first dielectric material 10 can be achieved for example by means of an electrical resistance heating system in which an electrical surface current is applied to the transparent conductive coating(s) 4, 5 on one side (FIG. 5 *a*)) or on both sides (FIG. 5 *b*)), as a result of which the transparent conductive coating(s) 4, 5 heat up on account of electrical losses and so the light modulation element 9 or the first dielectric material 10 is also heated.

A further possibility, illustrated in FIG. 5 *c*), for realizing a heating device 12 is to allow an electrical volume current to flow through the light modulation element 9 with the aid of the transparent, conductive coatings 4, 5.

In the case of the examples illustrated in FIGS. 5 *a*) to 5 *c*), both direct and alternating current can be used for a heating-up process.

As is illustrated schematically in FIG. 5 *d*), the light modulation element 9 or the first dielectric material 10 can also be heated by applying an AC voltage coordinated with the first dielectric material 10, wherein said AC voltage is as close as possible to the resonant frequency of the orientation polarization of the first dielectric material 10.

Furthermore, the light modulation element 9 or the first dielectric material 10 can also be heated by being irradiated externally. In this case, the radiation can be introduced into the light modulation element 9 externally (see FIG. 5 *e*)) or via a waveguide 19 (see FIG. 5 *f*)) Various heating effects can be utilized depending on the wavelength of the radiation. It is conceivable in principle to use microwave radiation through infrared radiation to γ radiation, wherein the respectively applicable legal regulations should be observed, of course.

In an extension of the irradiations mentioned in the previous paragraph, a medium (material, compound) having a high absorptance for a certain (ideally non-optical) wavelength can be incorporated into the region to be heated (in this case in the light modulation element 9 or in the first dielectric material 10). As a result, regions can be heated in a targeted manner and locally by irradiation with this wavelength.

Window heating applied to the first substrate 2 and/or the second substrate 3 or blowing heated air by means of a fan is furthermore conceivable as well. With regard to the shortest possible switching times and the lowest possible energy requirement, however, preference is given to heating the light modulation element 9 or the first dielectric material 10 as locally as possible.

FIGS. 3 and 4 illustrate examples of how various multistable transmittances and/or multistable scattering properties with regard to visible light (and optionally also with regard to light in the infrared range) can be realized with the aid of the light modulation apparatus 1 according to the present invention.

Since the examples in accordance with FIGS. 3 and 4 differ only in that a second dielectric material 13 is present in the light modulation element 9 in accordance with FIG. 4, the functioning of the light modulation apparatus 1 is explained in greater detail only with reference to FIG. 3.

FIG. 3 *a*) shows a state in which the light modulation element 9 or the first dielectric material 10 contained therein is at a temperature T2. In this state, the particles 11 contained in the first dielectric material 10 could become aligned randomly in all spatial directions, in principle, with the aid of their Brownian motion on account of the sufficiently low viscosity of the first dielectric material 10 (set state). However, since in accordance with FIG. 3 *a*) an electric field is applied at the light modulation element 9 by means of the closed switching device 14, the AC source 8 and the two transparent, electrically conductive coatings 4, 5, the particles 11 become aligned along the field lines of the electric field or remain aligned along the field lines of the electric field.

If the electrical circuit is then interrupted, as illustrated in FIG. 3 *b*), the particles 11 in the first dielectric material 10 become aligned randomly in all spatial directions and the light modulation apparatus 1 thus assumes a light-nontransmissive (or almost light-nontransmissive) or opaque state.

It goes without saying that it is also possible to pass from the state shown in FIG. 3 *b*) to the state in accordance with FIG. 3 *a*) and thus to achieve an alignment of the particles 11 along the field lines of the alternating electric field applied in accordance with FIG. 3 *a*), wherein the light modulation apparatus 1 assumes a more light-transmissive or less opaque, i.e. more transparent, state.

If, proceeding from a state in accordance with FIG. 3 *a*), the temperature of the light modulation element 9 or of the first dielectric material 10 is reduced to T1, the viscosity of the first dielectric material 10 rises to such a value that the particles 11 can no longer alter their current alignment in the first dielectric material 10 on the basis of Brownian motion, and the electrical circuit can be interrupted, as is shown in FIG. 3 *c*), without the alignment of the particles 11 in the first dielectric material 10 being able to be altered (stable state).

Moreover, proceeding from the state in accordance with FIG. 3 b), the temperature can be reduced to T1, as a result of which the "chaotic state" in accordance with FIG. 3 b) is "stabilized".

In the case of such a "chaotic state" of the particles 11 in the light modulation device 9, depending on the type and size of the particles 11 used, a large portion of the visible light and optionally in addition also a large portion of light in the (in particular near) infrared range can thus be prevented from transmission through the light modulation apparatus 1. What can thereby be achieved, for example, is that the space temperature of a space provided with the light modulation apparatus 1 can be kept appreciably lower than if simple glazing with the same area were used.

With use of a configuration of the light modulation apparatus 1 in accordance with FIG. 4, in a departure from that in accordance with FIG. 3, consideration should merely be given to keeping the temperature of the light modulation element 9 or of the first dielectric material 10 at <T3 in order that an undesired alteration of the position of the inclusions of first dielectric material 10 in the second dielectric material 13 is prevented.

This can be achieved for example by means of a corresponding driving of the heating device 12, wherein temperature data transmitted from the temperature measuring device 16 to the control device 15 can also be used, if appropriate, for the driving.

The first dielectric material 10 and the second dielectric material 13 can for example each be produced from polymerizable monomers or prepolymers which are polymerized by means of a respectively suitable polymerization method. If a first dielectric material 10 and a second dielectric material 13 are provided, the second dielectric material 13 can be produced for example in a first polymerization step, wherein the properties of the second dielectric material 13 have the effect that droplets composed of the monomers or prepolymers for the first dielectric material 10 with particles 11 dispersed therein form in the second dielectric material 13. Afterward, the first dielectric material 10 can be formed in a second polymerization step suitable for the monomers or prepolymers for the first dielectric material 10.

It is also conceivable, in a first step, to produce small spheres of first dielectric material 10 with particles 11 dispersed therein in a matrix material, then to dissolve or to remove the matrix material, to disperse the small spheres of first dielectric material 10 in polymerizable monomers or prepolymers for the second dielectric material 13 and subsequently to form the second dielectric material 13 by means of a polymerization step, as a result of which the spheres of first dielectric material 10 are "included" in a manner dispersed in the second dielectric material 13.

The following is a summary list of reference numerals and the corresponding structure used in the above description of the invention:
  1 light modulation apparatus
  2 first substrate
  3 second substrate
  4 electrically conductive coating
  5 electrically conductive coating
  6 electrical contact
  7 electrical contact
  8 electrical AC voltage source
  9 light modulation element
  10 first dielectric material
  11 particles
  12 heating device
  13 second dielectric material
  14 switching device
  15 control device
  16 temperature measuring device
  17 intermediate layer
  18 intermediate layer
  19 waveguide

The invention claimed is:

1. A planar light modulation apparatus, comprising:
a first planar substrate that is transparent for light having a wavelength in a range of 380 nm to 780 nm;
a second planar substrate that is reflective or is transparent for light having a wavelength in the range of 380 nm to 780 nm, said second substrate being disposed substantially parallel to said first substrate and spaced apart from said first substrate by a predetermined distance; and
transparent, electrically conductive coatings respectively disposed on mutually facing sides of said first and second substrates;
electrical contacts for connecting said transparent, electrically conductive coatings to an electrical voltage source;
a light modulation element disposed within a space formed between said electrically conductive coatings, said light modulation element including a dielectric material having a predefined concentration of particles dispersed therein, which particles, provided that the particles are arranged randomly in said dielectric material, render said light modulation element nontransmissive for a predefinable proportion of light impinging thereon having a wavelength in the range of 380 nm to 780 nm or cause said light modulation element to appear opaque, wherein said dielectric material, up to a first temperature of 25° C. or higher at atmospheric pressure, is solid or has a viscosity of such a magnitude that the particles cannot change a current alignment in said dielectric material based on Brownian motion; and
a heating device configured to heat the dielectric material to a second temperature, which is higher than the first temperature and at which said first dielectric material has a lower viscosity than at the first temperature, as a result of which the particles are enabled to alter an alignment thereof in said dielectric material based on Brownian motion.

2. The light modulation apparatus according to claim 1, wherein:
said dielectric material is a first dielectric material and said light modulation element further comprises a second dielectric material;
said first dielectric material having the predefinable concentration of particles dispersed therein is dispersed in a form of a multiplicity of inclusions;
said second dielectric material, up to a third temperature, which is higher than the second temperature, at atmospheric pressure, is solid or has such a high viscosity that the inclusions of said first dielectric material cannot alter their position within said second dielectric material.

3. The light modulation apparatus according to claim 2, wherein said second dielectric material is selected from at least one thermoplastic, elastomeric or thermosetting polymer.

4. The light modulation apparatus according to claim 1, further comprising:
an electrical AC voltage source connected to said transparent, electrically conductive coatings by way of said electrical contacts;

a switching device connected between one of said electrical contacts and said electrical AC voltage source and configured to selectively close and open an electrical circuit;
a control device connected to said switching device and to said heating device, said control device being configured to:
switch on said heating device in order to heat said first dielectric material to the second temperature or higher and to keep said dielectric material at the second temperature or higher for a predefinable time duration; or
switch on said heating device in order to heat said first dielectric material to the second temperature or higher and to keep said first dielectric material at the second temperature or higher for a predefinable time duration, and close the electrical circuit between said two transparent, electrically conductive coatings and said electrical AC voltage source at least for the predefinable time duration by way of said switching device.

5. The light modulation apparatus according to claim 4, further comprising:
a temperature measuring device for measuring a temperature of said light modulation element or of the light modulation apparatus, wherein the temperature measuring device is connected to said control device; and
wherein said control device is configured to monitor the temperature of said light modulation element or of the light modulation apparatus and to close the electrical circuit between said transparent, electrically conductive coatings and said electrical AC voltage source by way of said switching device as long as the temperature of said light modulation element or of the light modulation apparatus is greater than the first temperature.

6. The light modulation apparatus according to claim 5, wherein one or both of said transparent, electrically conductive coatings are configured to form said temperature measuring device, and wherein a temperature measurement is carried out based on a temperature-dependent electrical conductivity of the respective said electrically conductive coatings.

7. The light modulation apparatus according to claim 1, wherein the first temperature is a temperature in a range of 50° C. to 120° C.

8. The light modulation apparatus according to claim 7, wherein the first temperature is a temperature selected from the group of temperatures consisting of 50° C., 55° C., 60° C., 65° C., 70° C., 75° C., 80° C., 85° C., 90° C., 95° C., 100° C., 105° C., 110° C., 115° C. and 120° C.

9. The light modulation apparatus according to claim 7, wherein the second temperature is higher than the first temperature by 1° C. to 50° C.

10. The light modulation apparatus according to claim 9, wherein the second temperature is higher than the first temperature by an increase over the first temperature selected from the group consisting of 1° C., 2° C., 3° C., 4° C., 5° C., 10° C., 15° C., 20° C., 25° C., 30° C., 35° C., 40° C., 45° C. and 50° C.

11. The light modulation apparatus according to claim 9, wherein the third temperature is higher than the second temperature by 5° C. to 50° C.

12. The light modulation apparatus according to claim 11, wherein the third temperature is higher than the second temperature by an increase over the second temperature selected from the group consisting of the 5° C., 10° C., 15° C., 20° C., 25° C., 30° C., 35° C., 40° C., 45° C. and 50° C.

13. The light modulation apparatus according to claim 1, wherein:
said heating device is a planar, electrical resistance heating system configured to enable an electrical surface current to be conducted through one or both of said transparent, electrically conductive coatings;
said heating device is a planar, electrical resistance heating system configured to enable an electrical volume current to be conducted through the light modulation element by way of said transparent, electrically conductive coatings;
said heating device is configured to apply an AC voltage coordinated with said dielectric material, wherein a frequency of the AC voltage corresponds to a resonant frequency of an orientation polarization of said dielectric material or deviates therefrom only by a predefinable small value; or
said heating device is configured to heat at least the light modulation element by microwave radiation, infrared radiation or y radiation, wherein the respective radiation is radiated onto the light modulation element either from outside the light modulation element or by way of at least one waveguide arranged between said first substrate and said second substrate.

14. The light modulation apparatus according to claim 1, wherein said dielectric material is selected from the group consisting of at least one thermoplastic; a polymeric perfluoroether; a silicone; a siloxane; a paraffin; a stearin; and a mixture of two or more thereof.

15. The light modulation apparatus according to claim 14, wherein said dielectric material is selected from the group consisting of an acrylonitrile-butadiene-styrene, a polyamide, a polylactate, a polymethyl methacrylate, a polycarbonate, a polyethylene terephthalate, a glycol-modified polyethylene terephthalate, a polyethylene, a polypropylene, a polystyrene, a polyether ether ketone, a polyvinyl chloride, a celluloid, an acrylic resin, a polymethyl methacrylate, a polyurethane, a polycaprolactone, a polylactide, a polyvinylidene fluoride, a polyvinyl acetal, a polyvinyl alcohol and a polyethylene glycol.

16. The light modulation apparatus according to claim 15, wherein said dielectric material is selected from the group consisting of a polyvinyl formal, a polyvinyl butyral and a polyethylene glycol having a molar mass in a range of 1,000 to 35,000.

17. The light modulation apparatus according to claim 1, wherein said particles dispersed in said first dielectric material are selected from the group consisting of organic or inorganic particles, particles of polyhalogen compounds, organic or inorganic pigments, metal particles, crystals, crystallites and liquid crystals and of mixtures of at least two different particles of this type.

18. The light modulation apparatus according to claim 1, wherein at least one of the following is true:
one or both of said first planar substrate and said second planar substrate are formed from a glass or plastic that is transparent for light having a wavelength in the range of 380 nm to 780 nm;
said transparent, electrically conductive coatings are formed from indium tin oxide or fluorine-doped tin oxide;
the light modulation apparatus further comprises one or more intermediate layers between said first planar substrate and said second planar substrate;
the light modulation apparatus further comprises one or more intermediate layers composed of a polyethylene terephthalate or an ethylene vinyl acetate between said first planar substrate and said second planar substrate.

19. A vehicle, comprising at least one light modulation apparatus according to claim 1.

20. The vehicle according to claim 19, wherein said at least one light modulation apparatus is provided in a location selected from the group consisting of in a windshield, in a front side window, in a rear side window, in a rear window, in a floor window and in a roof window.

* * * * *